United States Patent [19]

Griffith

[11] Patent Number: 5,070,454
[45] Date of Patent: Dec. 3, 1991

[54] REFERENCE MARKER ORIENTATION SYSTEM FOR A RADIOGRAPHIC FILM-BASED COMPUTERIZED TOMOGRAPHY SYSTEM

[75] Inventor: Lionell K. Griffith, Acton, Calif.

[73] Assignee: Olganix Corporation, Reseda, Calif.

[21] Appl. No.: 516,649

[22] Filed: Apr. 30, 1990

Related U.S. Application Data

[63] Continuation of Ser. No. 172,609, Mar. 24, 1988.

[51] Int. Cl.⁵ .......................................... G01N 23/00
[52] U.S. Cl. ............................ 364/413.13; 250/491.1; 378/163
[58] Field of Search .................... 378/167; 364/413.13

[56] References Cited

U.S. PATENT DOCUMENTS 3,742,236 6/1973 Richards .............................. 378/23
3,818,220 6/1974 Richards .............................. 378/23
4,598,369 7/1986 Wang et al. ................... 364/413.13

Primary Examiner—Clark A. Jablon
Attorney, Agent, or Firm—Nilsson, Robbins, Dalgarn, Berliner, Carson & Wurst

[57] ABSTRACT

An object is exposed to penetrating radiation at each of a plurality of partial rotations of the object. Radiation transmitted through the object strikes a separate sheet of radiographic film for each exposure to record an entire radiographic image of the object for each angular orientation. At least two reference markers for providing a reference relative to the object are positioned between a rotating device and the sheet of radiographic film. They are positioned so that their centers constitute the base points of an equilateral triangle, the apex point thereof being the center of the rotating device.

3 Claims, 3 Drawing Sheets

REFERENCE MARKER ORIENTATION SYSTEM FOR A RADIOGRAPHIC FILM-BASED COMPUTERIZED TOMOGRAPHY SYSTEM

This is a continuation of application Ser. No. 172,609, filed Mar. 24, 1988.

FIELD OF THE INVENTION

The fields of art to which the invention pertains include the fields of dynamic tomography and computed tomography.

BACKGROUND AND SUMMARY OF THE INVENTION

Accurate and detailed visual information about the internal structure of an object is extremely valuable in a variety of applications. In the practice of medicine for example, visual examination of internal organs or bones is necessary to properly diagnose many ailments or to prepare for surgery. Non-invasive techniques, such as x-ray examination, often provide the only means of obtaining such visual information. As another example, quality control analysis of manufactured products requires inspection of internal parts.

Several techniques have been employed to obtain visual information about the internal structure of an object, without opening the object. Generally, penetrating radiation, such as x-rays or gamma rays, are directed at an object and the radiation which is transmitted through the object is recorded either on radiographic film or with electronic radiation detectors employing scintillation crystals. According to one known technique, "Computed Tomography" (CT), a radiation source is mounted in rotatable relation to a row of radiation detectors and an object is placed therebetween. The radiation source is then rotated to expose a section of the object to radiation from several angles and radiation measurements made by the radiation detectors are processed by a computer to generate a two-dimensional "slice", representative of the internal structure of the exposed section of the object.

This limitation of a single slice for each section of the object presents several problems if more than one slice is desired as, for example, in generating a three-dimensional internal image of the object. First, the object must be moved discrete distances at discrete time intervals, corresponding to the "thickness" of each slice and the amount of time required to rotate the radiation source, thus requiring a complicated and expensive mechanical system to move the object in coordination with the rotating radiation source. Secondly, the object must be exposed to additional radiation for each additional slice, resulting in increased radiation dosage in proportion to the number of slices desired. Additionally, the amount of time required to complete the procedure is prolonged by each slice.

According to another known technique, "Dynamic Tomography", see, e.g., Richards, U.S. Pat. No. 4,167,672, a set of radiographs of an object is produced by exposing the object to radiation from a plurality of angles and recording each exposure on a separate piece of radiographic film. The set of radiographs can be superimposed in a stack for viewing and by shifting alignment can produce virtual focus of any image plane parallel to the plane of each film. This technique solves the single slice problem presented by computed tomography, above, because the entire internal structure of the object can be displayed with a small number of radiographs. However, several other problems are presented. First, a complicated mechanical viewing system is required to achieve proper alignment while shifting the stack of radiographs. Secondly, the accuracy of alignment is restricted by the limitations of the physical components of a mechanical viewing system and the film itself. Thirdly, image enhancement and manipulation are not possible with a stack of radiographs. Additionally, image planes non-parallel to the plane of each film cannot be adequately displayed by mechanical means.

The present invention provides a computerized dynamic tomography system which can display any image plane or series of image planes of an object, for any desired angle, from a small number of radiographic images of the object. A radiation source exposes the object to penetrating radiation at a plurality of partial rotations of the object on a platform assembly. A separate radiographic film records the transmitted radiation at each partial rotation and each film is digitized by a video camera. The digitized images are then supplied to a computer which registers each image with minimal assistance from a human operator.

The operator selects a level or series of levels desired for viewing and the computer displaces and selectively combines pixel values of the digitized images to produce selected images of the internal structure of the object. Interactive enhancement and manipulation of images is provided and compression of images is done to minimize the memory requirements of the invention.

DETAILED DESCRIPTION

Figure 1:
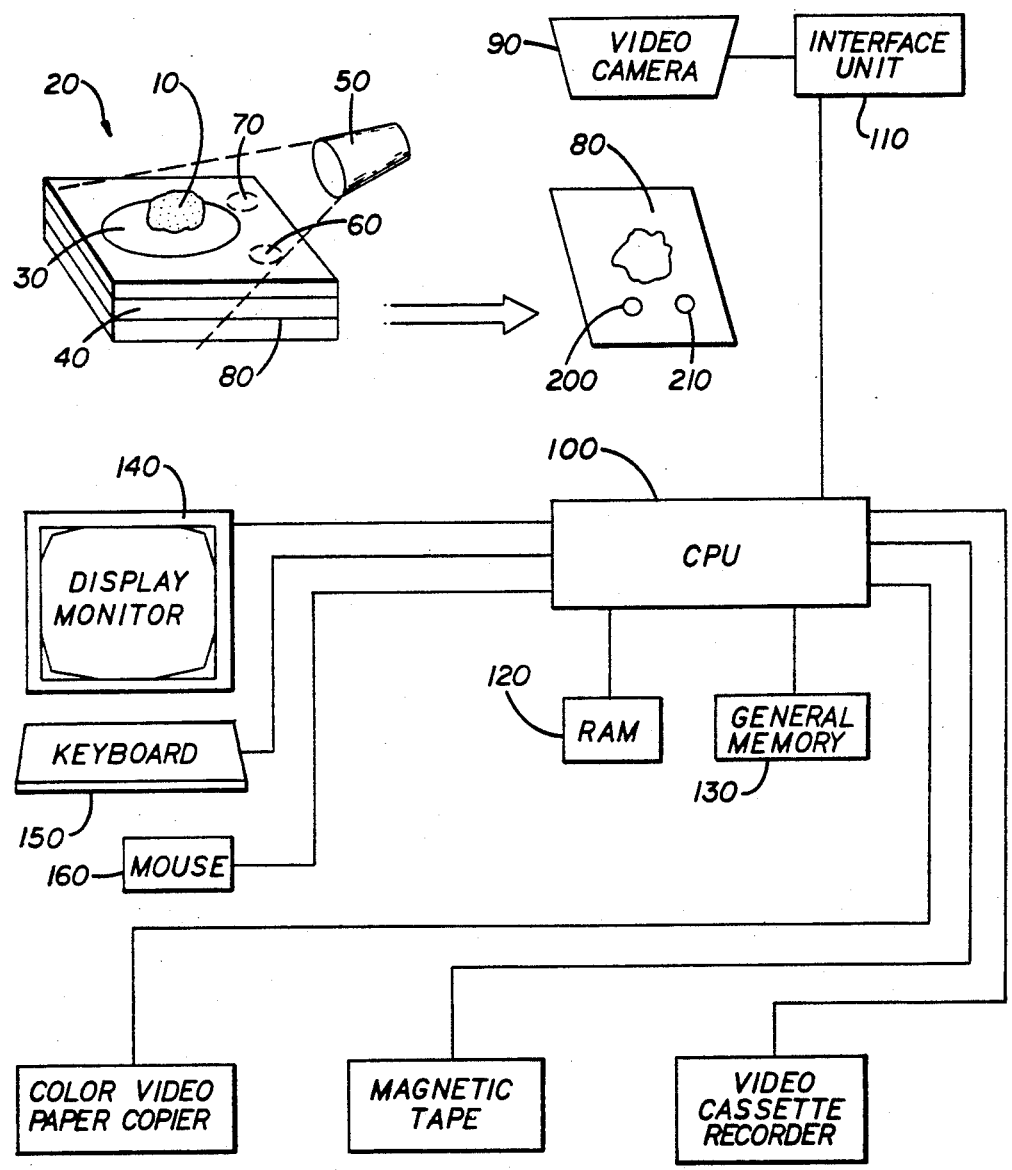
FIG. 1 is a schematic illustration of the disclosed embodiment of the invention.

Referring to FIG. 1, there is shown an exemplary embodiment of the system of the present invention. An object 10 to be examined is placed on a platform assembly 20 comprising a rotation plate 30 and a film cassette 40. The rotation place 30 is made of a low-density substance which is transparent to penetrating radiation, such as x-rays, and is rotatable by known mechanical means to provide a plurality of partial rotations of the object 10. In this embodiment, eight partial rotations are optimal, but other numbers of rotations are possible. At each partial rotation, the object 10 is exposed to penetrating radiation from a radiation source 50 which is positioned on a support member (not shown) to cause the optical axis of the radiation source 50 to intersect the center of the rotation plate 30 at an angle between 45 and 90 degrees.

Two circular discs 60 and 70, made of a high-density substance, serve as reference markers and are mounted in the platform assembly 20 between the rotation plate 30 and the film cassette 40. They are positioned so that their centers constitute the base points of an equilateral triangle, the apex point being the center of the rotation plate 30. A separate sheet of radiographic film 80 is inserted into the film cassette 40 prior to each partial rotation of the rotation plate 30 and is removed subsequent to exposure from the radiation source 50 so that each sheet of radiographic film 80 records an entire radiographic image of the object 10 in a distinct angular orientation.

After being developed, each sheet of radiographic film 80 is placed before a video camera 90 in perpendicular relationship to the optical axis of the video camera 90 and positioned so that the long axis of the film 80 is parallel to the long axis of the video camera image. The distance between the video camera lens and the film plane is uniformly maintained for each film 80 and the focal plane of the video camera 90 is adjusted as closely as possible to the film 80. A selected area of each film 80, containing the shadow images of the object 10 and the reference markers in the center of the selected area is digitized. That is, electronic signals are supplied to a computer 100 through an interface unit 110. The signals supplied by the video camera 90 comprise binary signals representative of an intensity value, on a 256 level gray scale, for each pixel of the selected area on each film 80. The pixel values are stored in random access memory (RAM) 120 or general memory 130 in a separate two-dimensional byte array for each digitized film image, where a first dimension corresponds to the x-coordinate axis and a second dimension corresponds to the y-coordinate axis.

Figure 2A:
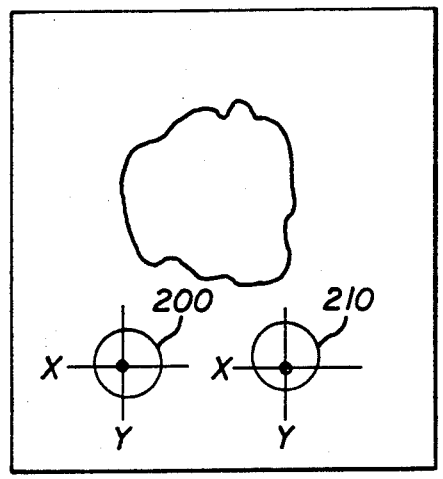
FIG. 2a is a graphic illustration of the method of the invention for locating the center of a reference marker.
Figure 2B:
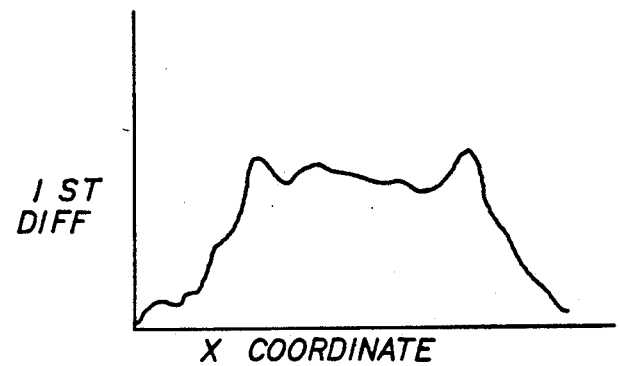
FIGS. 2b and 2c are graphic illustrations of first differential values along x and y axes emanating from a designated point within a reference marker.
Figure 2C:
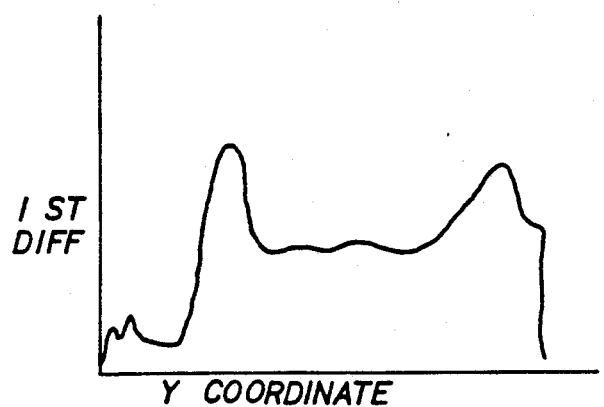

Because the dimensions of each film 80 cannot be adequately reproduced for successive films and a rigid relationship among the radiation source 50, the film 80 and the video camera 90 cannot be maintained, errors of rotation and displacement are present in each digitized image. To correct such errors, each digitized image must be registered utilizing information contained on the image. Referring to FIGS. 1 and 2a, each digitized image is displayed on a display monitor 140 and a human operator utilizes a keyboard 150 or a mouse device 160 to designate a point within each reference marker 200 and 210. The computer 100 then determines the approximate center of each reference marker 200 and 210 according to a program adopting the following method. Referring to FIGS. 2a, 2b and 2c, the first differential of pixel intensity is computed along the x and y axes radiating from the designated point within each reference marker 200 and 210. That computation is accomplished by finding the distance weighted mean of the absolute values of the differences between immediately bounding pixels. Points lying on the edge of each reference marker, 200 and 210 are located by finding the x and y coordinate values of the maximum first differential locations along the x and y axes for each side of the designated point. The coordinates for the centers of the reference markers 200 and 210 are determined by computing the mean x edge coordinate value and the mean y edge coordinate value for each reference marker 200 and 210.

Figure 3:
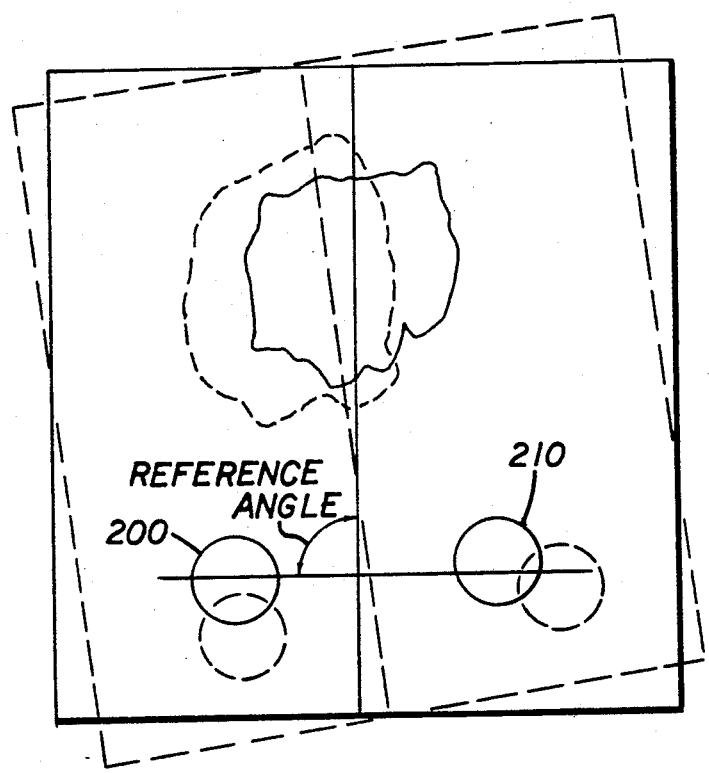
FIG. 3 is a graphic illustration of the error of rotation.

Referring to FIG. 3, the angle of the error of rotation of each digitized image is determined according to the following formula:

$$angle\_error = 90.0 - reference\_angle1 - ARCTAN((x1-x2)/(y2-y1))$$

where x1,y1 are the coordinate values of the center of one reference marker 200, x2,y2 are the coordinate values of the center of the second reference marker 210, and reference_angle1 is the angle of a line passing through the centers of the reference markers 200 and 210 with respect to the long axis of the film cassette 40. The error of the center of rotation of each digitized image is determined according to the following formulas:

$$d1 = SQRT(SQR(X2-X1)+SQR(Y2-Y1))*radius\_ratio$$

$$angle1 = reference\_angle1 + angle\_error$$

$$x\_center = x1 + d1 * SIN(angle1-90.0)$$

$$y\_center = y1 + d1 * COS(angle1-90.0)$$

where radius_ratio is the ratio of the distance between the centers of the reference markers 200 and 210 to the distance between one reference marker 200 and the center of the rotation plate 30, and all other variable values are as above.

The error in the angle of rotation and the error in the center of rotation are used to adjust the registration of each digitized image according to the following methods for image translation and rotation. A new set of coordinates (x',y') for each pixel are calculated as follows:

$$y1 = -(y-yc'+d * SIN(angle)) * SIN(angle) + 2 * xc' - xc$$

$$y2 = (y-yc'+d * SIN(angle)) * COS(angle) + 2 * yc' - yc$$

$$x1 = (y-yc'+d * COS(angle)) * COS(angle)$$

$$x2 = (x-xc'+d * COS(angle)) * SIN(angle)$$

$$x' = x1 - y1$$

$$y' = x2 + y2$$

where x,y are the existing coordinates of the pixel, xc,yc are the coordinates of the center of rotation of the existing image, xc',yc' are the coordinates of the center of rotation of the new image, "d" is the desired displacement along the long axis of the new image, and "angle" is the rotation required to align the long axis of the new image axis with the long axis of the existing image.

Figure 4:
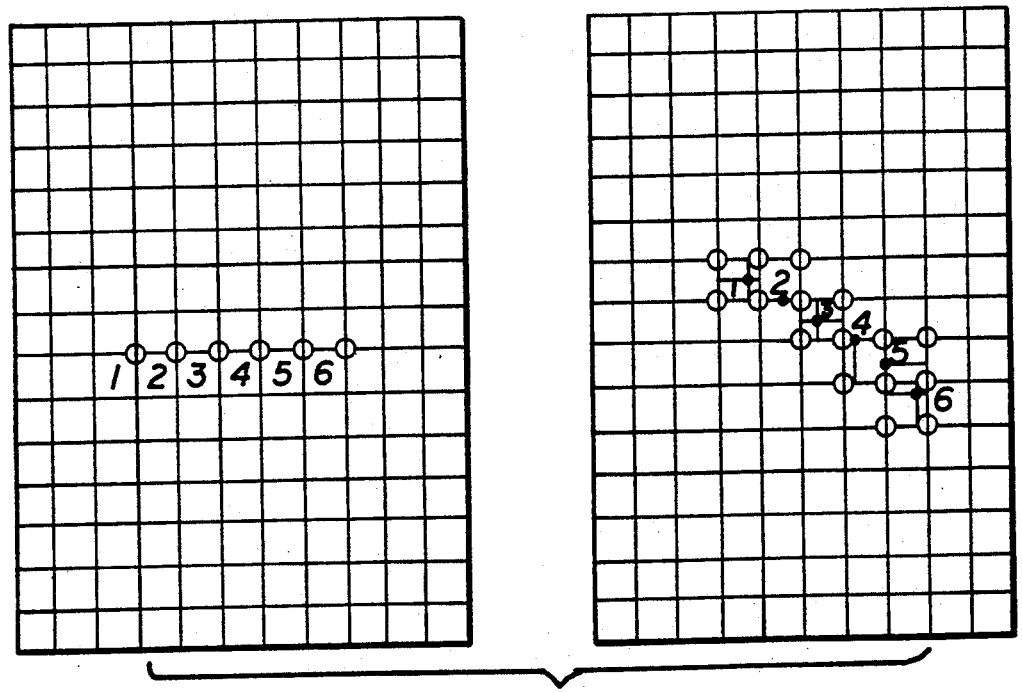
FIG. 4 is a graphic illustration of the assignment of weighted average pixel values.

Referring to FIG. 4, rotation or translation of an existing image may require existing pixels to be repositioned in locations at the sub-pixel level. Because such locations cannot be represented by single pixels, the four immediately adjacent pixels are assigned weighted average values according to the following formula:

$$pixel = (image[xl,yt] * wr * wb + image[xr,yt] * wl * wb + image[xl,yb] * wr * wt + image[xr,yb] * wl * wt)/n$$

where:

$xl$ = the integer portion of $x'$, $yt$ = the integer portion of $y'$, $xr = xl + 1$ $yb = yt + 1$ $wl$ = the maximum pixel value * the fractional portion of $x'$, $wr$ = the maximum pixel value − $w1$, $wt$ = the maximum pixel value * the fractional portion of $y'$, $wb$ = the maximum pixel value − $wt$, $n$ = SQR(maximum pixel value)

After each of the digitized images is registered, it is stored in general memory 130. The operator may recall an image for interactive enhancement by specifying with the keyboard 150 or mouse device 160 any of the following functions: contrast enhancement, profile wedge correction, selection of area of interest, histogram correction, edge enhancement and false color. Known image processing techniques are used for these functions and are not described in detail here.

The operator selects a displacement corresponding to the level or levels of the object, i.e., image planes desired for viewing. For example, the operator can select a single level halfway through the object or, as another example, the operator can select all levels of the object, each level being one pixel in depth.

The selected displacement is utilized in the rotation and translation formulas, above, as the value for "d". Each registered image is rotated and translated in accordance with the above formulas and then the images are combined, one at a time, to form a selected image according to the following formula:

$$CP = CP + CP*(((IP+MP)/2) - MP)/MP$$

where CP is a pixel value in the selected level image, IP is a pixel value in a registered image, and MP is the maximum pixel value.

Image planes non-parallel to the film image planes can be selected by extracting pixels from successive levels in accordance with the orientation of the newly selected image plane. For example, an image plane perpendicular to the plane of the film is formed by selecting a series of levels covering the area of interest and extracting pixels from the same row in each successive level in ascending order. To illustrate, the pixels in the 10th row of the first level are initially extracted. The pixels in the 10th row of the second level are extracted next and positioned adjacent the row of pixels from the first level. Then the pixels in the 10th row of the third level are extracted and positioned adjacent the row of pixels from the second row. This process is repeated until the perpendicular image plane is completed.

Referring again to FIG. 1, the selected image is displayed on the display monitor 140 and the operator can interactively enhance the displayed image as discussed above. The operator can also have the image printed on a color video paper copier 170, or stored in general memory 130, on magnetic tape 180, or on a video cassette 190.

In order to conserve memory space, the images are compressed prior to storage in general memory 130 and restored when necessary, as when forming a selected image for display. The images are compressed as follows. All pixel values below a given threshold value are set to zero, as well as all pixel values outside a selected boundary containing all of the useful image. For the remaining pixels, beginning with the first row and first column of the image, all adjacent pixels having the same value are counted and treated as a group. If a group contains one or two adjacent pixels of the same value, the value of each pixel is stored in a separate byte. If a group contains from three to 255 adjacent pixels of the same value, 128 is added to the group value and stored in a single byte, with the number of pixels in the group stored in the next byte. If a group contains more than 255 pixels, each sub-group of 255 pixels is stored in the manner of the previous group until all the pixels are stored. The compression process is reversed in order to restore the image.

It is to be understood that the above described embodiment is illustrative of the principles of the invention and that other embodiments may be possible without departing from the scope and spirit of the invention. Any other form of energy, such as gamma rays or electromagnetic radiation, capable of penetrating an object and being recorded on collection media may be used in accordance with the principles of the present invention. Additionally, real time images are displayed by converting radiological information of an object into electronic signals using collection media other than film. For example, a fluoroscopic screen is used to convert radiological information of an object into visual information which in turn is converted into electronic signals by a video camera. The electronic signals are then digitized, displaced, combined and displayed in the same manner as disclosed above in reference to the embodiment employing film as a collection medium.

I claim:

1. An apparatus for representing the internal structure of an object, comprising:
    means for exposing said object to penetrating radiation;
    means for rotating said object, said rotating means being disposed within a housing in angular relationship to said exposing means;
    film cassette means for storing radiographic film, said film cassette means being positioned within said housing beneath said rotating means; and
    at least two reference markers for providing a reference relative to said object, said reference markers being positioned between said rotating means and a sheet of radiographic film in said film cassette means and positioned so that their centers constitute the base points of an equilateral triangle, the apex point thereof being the center of the rotation means.

2. The apparatus of claim 1, wherein said film cassette means is positioned in acute angular relationship to said exposing means.

3. The apparatus of claim 1, wherein said reference means is positioned in fixed relationship to said exposing means.

* * * * *